(12) United States Patent
Taniguchi et al.

(10) Patent No.: US 12,525,863 B2
(45) Date of Patent: Jan. 13, 2026

(54) POWER CONVERSION DEVICE INCLUDING A POWER CONVERTER AND A CONTROLLER CONFIGURED TO SET A SWITCHING FREQUENCY AND A CONTROL FREQUENCY

(71) Applicant: Mitsubishi Electric Corporation, Tokyo (JP)

(72) Inventors: Tomoyuki Taniguchi, Tokyo (JP); Hiroto Mizutani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 204 days.

(21) Appl. No.: 18/028,776

(22) PCT Filed: Dec. 18, 2020

(86) PCT No.: PCT/JP2020/047395
§ 371 (c)(1),
(2) Date: Mar. 28, 2023

(87) PCT Pub. No.: WO2022/130612
PCT Pub. Date: Jun. 23, 2022

(65) Prior Publication Data
US 2023/0336069 A1    Oct. 19, 2023

(51) Int. Cl.
*H02M 1/00* (2007.01)
*H02M 3/335* (2006.01)

(52) U.S. Cl.
CPC ....... *H02M 1/0025* (2021.05); *H02M 1/0009* (2021.05); *H02M 3/33507* (2013.01)

(58) Field of Classification Search
CPC ............. H02M 1/0009; H02M 1/0025; H02M 3/33507
See application file for complete search history.

(56) References Cited

U.S. PATENT DOCUMENTS

2008/0094861 A1* 4/2008 Wang .................... H02M 3/156
363/21.11
2019/0190402 A1* 6/2019 Kamatani ......... H02M 7/53871
(Continued)

FOREIGN PATENT DOCUMENTS

DE    112018004544 T5    5/2020
EP        2292079 B1    8/2019
(Continued)

OTHER PUBLICATIONS

Office Action issued Nov. 1, 2024 in Chinese Patent Application No. 202080107672.6, 12 pages.
(Continued)

*Primary Examiner* — Monica Lewis
*Assistant Examiner* — Lakaisha Jackson
(74) *Attorney, Agent, or Firm* — XSENSUS LLP

(57) ABSTRACT

In a controller for a power converter, a switching frequency of a switching element is determined on the basis of at least one of a magnetic parameter of a magnetic component and an electric parameter of the power converter, and the switching frequency changes stepwise in each of M intervals on the basis of one of a predetermined time width and a predetermined electric quantity width, M being an integer not less than 2. A control frequency is a value obtained by dividing the switching frequency by an integer P not less than 2.

20 Claims, 7 Drawing Sheets

(56) References Cited

U.S. PATENT DOCUMENTS

| | | | |
|---|---|---|---|
| 2020/0274441 A1* | 8/2020 | Chen | H02M 1/4266 |
| 2021/0135578 A1* | 5/2021 | Tanaka | H02M 7/537 |
| 2023/0299663 A1* | 9/2023 | Liu | H02M 1/32 |
| | | | 363/49 |

FOREIGN PATENT DOCUMENTS

| | | |
|---|---|---|
| EP | 3582384 A1 | 12/2019 |
| JP | 2010-041877 A | 2/2010 |
| JP | 2014-087196 A | 5/2014 |
| JP | 2015-089197 A | 5/2015 |
| JP | 2015-186436 A | 10/2015 |
| JP | 2016-220302 A | 12/2016 |

OTHER PUBLICATIONS

International Search Report and Written Opinion mailed on Feb. 16, 2021, received for PCT Application PCT/JP2020/047395, filed on Dec. 18, 2020, 9 pages including English Translation.
Supplementary European Search Report mailed Jan. 3, 2024, in the corresponding European Patent application No. 20965999.4, 8 pages.
European Office Action dated Oct. 28, 2025 of the corresponding European patent application No. EP20965999.4.

* cited by examiner

POWER CONVERSION DEVICE INCLUDING A POWER CONVERTER AND A CONTROLLER CONFIGURED TO SET A SWITCHING FREQUENCY AND A CONTROL FREQUENCY

CROSS-REFERENCE TO RELATED APPLICATION

The present application is based on PCT filing PCT/JP2020/047395, filed Dec. 18, 2020, the entire contents of which are incorporated herein by reference.

TECHNICAL FIELD

The present disclosure relates to a power conversion device.

BACKGROUND ART

For achieving size reduction and weight reduction of power conversion devices, a method of increasing the driving frequency (hereinafter, referred to as switching frequency) of a switching element is mainly used. If the switching frequency is constantly fixed to be high, switching loss increases. Therefore, there have been studies for setting the switching frequency changeably in accordance with the operation condition (see, for example, Patent Document 1).

CITATION LIST

Patent Document

Patent Document 1: Japanese Laid-Open Patent Publication No. 2015-186436

SUMMARY OF THE INVENTION

Problems to be Solved by the Invention

In a power conversion device described in Patent Document 1, the carrier frequency for switching is discontinuously changed on the basis of the phase of input AC voltage of a rectification circuit, and control is performed using physical quantities sampled at the top and/or the bottom of the carrier. If this technology is directly applied to such cases where the maximum value of the required switching frequency is high, where complicated control processing is required, and where a plurality of power conversion devices are controlled by one microcomputer, there is a problem that the processing load of the microcomputer, i.e., a controller, increases.

The present disclosure has been made to solve the above problem, and an object of the present disclosure is to reduce the processing load of a controller.

Solution to the Problems

A power conversion device according to the present disclosure includes: a power converter which includes a magnetic component and a switching element, and performs power conversion; and a controller which performs ON/OFF control of the switching element on the basis of a duty cycle for the switching element and a switching frequency for driving the switching element, under a control cycle determined by a control frequency. In the controller, the switching frequency is determined on the basis of at least one of a magnetic parameter of the magnetic component and an electric parameter of the power converter, and the switching frequency changes stepwise in each of M intervals on the basis of one of a predetermined time width and a predetermined electric quantity width, M being an integer not less than 2. The control frequency is a value obtained by dividing the switching frequency by an integer P not less than 2.

Effect of the Invention

With the power conversion device according to the present disclosure, the processing load of a controller can be reduced.

DESCRIPTION OF EMBODIMENTS

Summary of Present Disclosure

Figure 1:
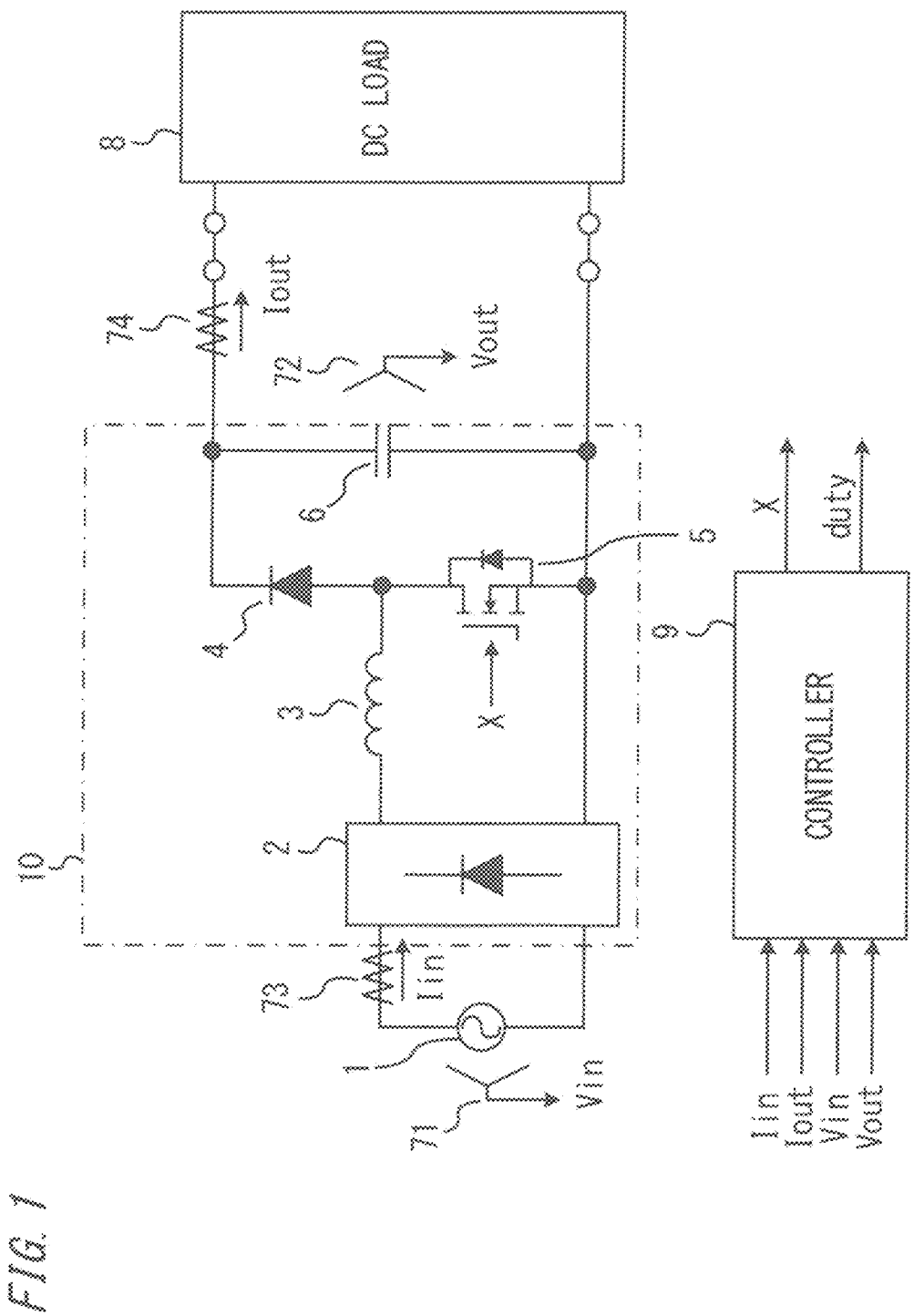
FIG. 1 shows an example of a circuit configuration of a power conversion device according to embodiment 1.

A power conversion device according to the present disclosure includes: a power converter which includes a magnetic component and a switching element, and performs power conversion; and a controller which performs ON/OFF control of the switching element on the basis of a duty cycle for the switching element and a switching frequency for driving the switching element, under a control cycle determined by a control frequency. In the controller, the switching frequency is determined on the basis of at least one of a magnetic parameter of the magnetic component and an electric parameter of the power converter, and the switching frequency changes stepwise in each of M intervals on the basis of one of a predetermined time width and a predetermined electric quantity width, M being an integer not less than 2. The control frequency is a value obtained by dividing the switching frequency by an integer P not less than 2.

With the power conversion device according to the present disclosure, the control frequency can be reduced to 1/P of the switching frequency. Thus, in such cases where the maximum value of the required switching frequency is high, where complicated control processing is required, and where a plurality of power conversion devices are controlled by one controller (microcomputer), it is possible to reduce the processing load of the controller (microcomputer).

Here, the switching frequency is determined on the basis of at least one of the magnetic parameter of the magnetic component and the electric parameter of the power converter. As the magnetic parameter of the magnetic component, an inductance of the magnetic component, the number of turns, an effective sectional area of a magnetic core, or a magnetic flux density of a magnetic core can be used. As the electric parameter of the power converter, a voltage, current, or power condition can be used. In embodiment 1 described below, a magnetic flux density of a magnetic core of a reactor is used as the magnetic parameter of the magnetic component. In embodiment 2, current ripple of input current of the power converter is used as the electric parameter of the power converter. In embodiment 3, a magnetic flux density of a magnetic core of a reactor or a transformer is used as the magnetic parameter of the magnetic component. In embodiment 4, current ripple of output current of the power converter is used as the electric parameter of the power converter.

As the predetermined time width and the predetermined electric quantity width, one of a time width, a phase width, a voltage width, a current width, or a power width, set arbitrarily, is used. In embodiment 1 and embodiment 2, as the predetermined time width, a half cycle of an input AC voltage phase is used. In embodiment 3 and embodiment 4, as the predetermined electric quantity width, an operation range of output voltage of the power converter is used.

Hereinafter, preferred embodiments of the power conversion device according to the present disclosure will be described with reference to the drawings. The same or corresponding things and parts are denoted by the same reference characters and the detailed description thereof is omitted. Also in the following embodiments, components denoted by the same reference characters will not be described repeatedly.

Embodiment 1

A power conversion device according to embodiment 1 will be described with reference to the drawings. FIG. 1 snows an example of a circuit configuration diagram of the power conversion device according to embodiment 1, which includes an AC/DC converter 10 for converting AC power to DC power.

[Explanation of Circuit Configuration in Embodiment 1]

In the power conversion device shown in FIG. 1, AC power is inputted from an AC power supply 1 to the AC/DC converter 10 which is a power converter, and DC power is outputted from the AC/DC converter 10 to a DC load 8. The AC/DC converter 10 includes an input-side diode rectification bridge circuit. 2, a power factor correction reactor 3, a diode element 4, a switching element 5, and a smoothing capacitor 6. The AC/DC converter 10 which is a power converter is provided with a controller 9 which receives detection signals from a first voltage detector 71, a second voltage detector 72, a first current detector 73, and a second current detector 74 and performs ON/OFF control of a switching element 5. In this example, the AC/DC converter 10 is shown as a boost chopper circuit. However, a buck circuit or a buck-boost circuit is also applicable as long as the circuit includes a reactor which is a magnetic component.

The AC power supply 1 is a commercial AC grid, a private power generator, or the like. The CC load 8 may be a simple resistor load, or may be a high-voltage battery for vehicle traveling, a lead battery which is a power supply for vehicular electrical equipment, or an electric double layer capacitor (EDLC), for example. The AC power supply 1 and the DC load 8 are not limited to the above ones.

The power factor correction reactor 3 is a current limiting reactor having one end connected to a positive-side output bus of the input-side diode rectification bridge circuit 2, and another end connected to a connection point between the diode element 4 and the switching element 5. The power factor correction reactor 3 may be connected to a negative-side output bus of the input-side diode rectification bridge circuit 2 and a source terminal of the switching element 5, or may be divisionally connected to each of both ends of input and output buses of the input-side diode rectification bridge circuit 2.

The diode element 4 is not limited to a type such as a fast recovery diode (FRD) or a soft recovery diode (SBD), and may be formed from a material such as silicon carbide (SiC), gallium nitride (GaN), or gallium oxide (Ga2O3). Further, a switching element subjected to synchronous rectification may be used instead of the diode element 4.

The switching element 5 is not limited to an insulated gate bipolar transistor (IGBT) or a metal oxide semiconductor field effect transistor (MOSFET), and may be a SiC-MOSFET, a GaN-FET, a GaN high electron mobility transistor (HEMT), or a Ga2O3-MOSFET.

The AC/DC converter 10 shown in FIG. 1 has a boost chopper circuit configuration, as described above. However, the AC/DC converter 10 may be a totem-pole type or a semi-bridgeless type not having the input-side diode rectification bridge circuit 2.

The controller 9 of the power conversion device of the present disclosure performs control calculation per control cycle determined by a control frequency described later, on the basis of at least one or all of detection values of the first voltage detector 71, the second voltage detector 72, the first current detector 73, and the second current detector 74. Then, the controller 9 controls the switching element 5 of the AC/DC converter 10. That is, the controller 9 transmits a driving signal X to the gate of the switching element 5 on the basis of at least one or all of detection values of the first voltage detector 71, the second voltage detector 72, the first current detector 73, and the second current detector 74, to perform ON/OFF control of the switching element 5, whereby desired operation can be performed.

In addition, as described later, the controller 9 performs appropriate feedback calculation in accordance with the operation mode of the power conversion device, thus outputting a duty cycle duty_fb and calculating a duty cycle duty for the switching element 5.

Figure 2:
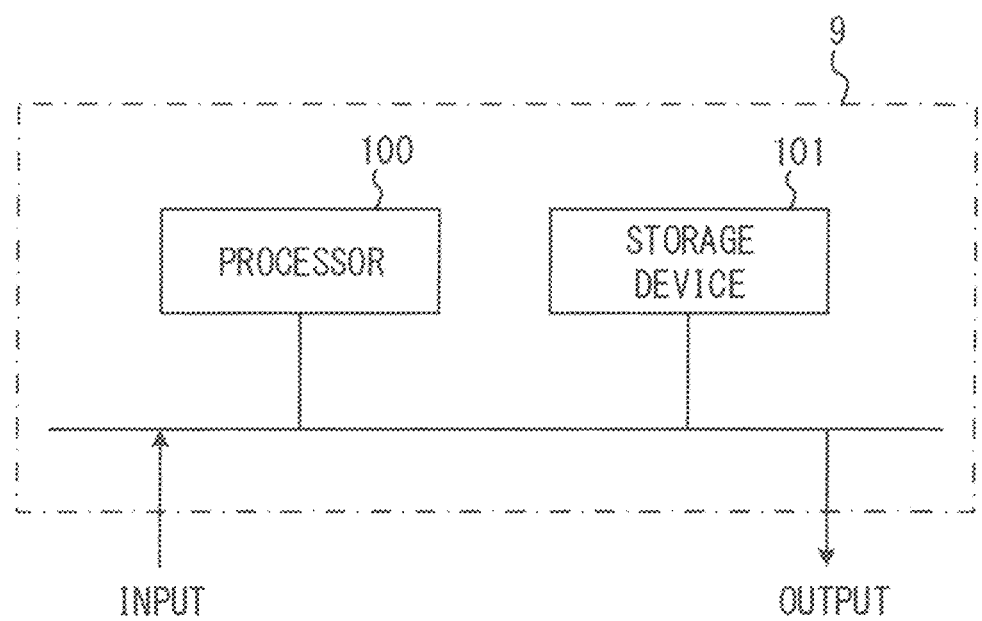
FIG. 2 is a block diagram showing a configuration example of hardware of a control device according to embodiment 1.

FIG. 2 is a block diagram showing an example of hardware of a microcomputer in the controller 9. The hardware of the microcomputer is composed of a processor 100 and a storage device 101. Although not shown, the storage device 101 is provided with a volatile storage device such as a random access memory and a nonvolatile auxiliary storage device such as a flash memory. Instead of the flash memory, an auxiliary storage device of a hard disk may be provided. The processor 100 executes a program inputted from the storage device 101, to output the driving signal X. In this case, the program is inputted from the auxiliary storage device to the processor 100 via the volatile storage device. The processor 100 may output data such as a calculation result to the volatile storage device of the storage device 101, or may store such data into the auxiliary storage device via the volatile storage device.

[Explanation of Operation Based on Magnetic Flux Density Constant Control]

First, control for the switching frequency of the switching element 5 and the control frequency in the controller 9 with respect to a magnetic flux density B of a magnetic core of the power factor correction reactor 3 will be described. In embodiment 1, the change amount of output voltage Vout of the AC/DC converter 10 is regarded as zero, that is, the output voltage Vout is regarded as a constant value.

Figure 3:
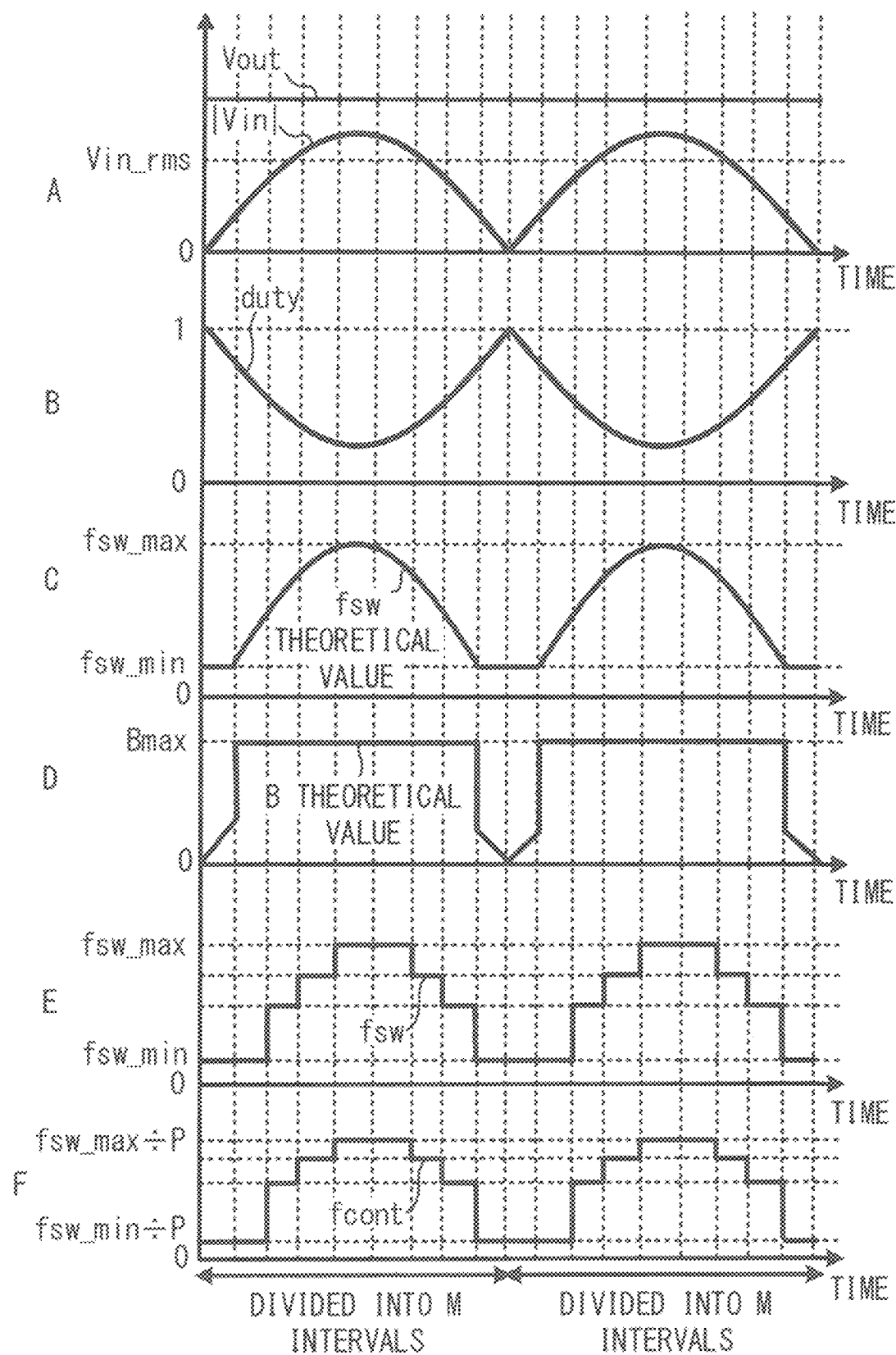
FIG. 3 is an operation waveform diagram in the power conversion device according to embodiment 1.

FIG. 3 is an operation waveform diagram of the switching frequency and the control frequency in the AC/DC converter 10 and the controller 9 in the present embodiment, and shows operation in one cycle of the AC power supply 1.

In FIG. 3A, the instantaneous value of input voltage Vin from the AC power supply 1 (an output value of the first voltage detector 71) is full-wave rectified via the input-side diode rectification bridge circuit 2, so as to become input voltage |Vin|. The output voltage Vout of the AC/DC converter 10 (an output value of the second voltage detector 72) is DC voltage Vout having a constant value as shown in FIG. 3A. In FIG. 3A, Vin_rms indicates the effective value of the input voltage Vin.

In FIG. 3B, the duty cycle duty for the switching element 5 changes so as to become 1 at a phase where the input voltage Vin is zero, and become minimum at a phase where the input voltage Vin has a peak value. This operation can be represented using the following Expression (1). The duty cycle duty for the switching element 5 is determined on the basis of a duty cycle duty_vt obtained by Expression (1) and the duty cycle duty_fb calculated through feedback calculation described later. Specifically, using the duty cycle duty_fb as a feedback term and the duty cycle duty_vt as a feedforward term, control is performed so that only the feedback term or the sum of the feedback term and the feedforward term becomes the duty cycle duty for the switching element 5.

[Mathematical 1]

$$\text{duty\_vt} = \frac{Vout - |Vin|}{Vout} \quad (1)$$

On the other hand, the magnetic flux density B of the magnetic core of the power factor correction reactor 3 is represented by the following Expression (2). Here, in Expression (2), N is the number of turns of the power factor correction reactor 3, Ae is the effective sectional area of the magnetic core of the power factor correction reactor 3, and fsw is the switching frequency of the switching element 5.

[Mathematical 2]

$$B = \frac{|Vin|}{2 \cdot N \cdot Ae} \cdot \frac{\text{duty}}{fsw} \quad (2)$$

Here, it is assumed that the output voltage Vout is constant, the switching frequency fsw oi the switching element 5 is fixed at a predetermined value, e.g., a switching frequency fsw_max, and the magnetic flux density B of the magnetic core of the power factor correction reactor 3 is reduced as the input voltage Vin is reduced. In this case, even when the magnetic flux density B of the magnetic core of the power factor correction reactor 3 becomes zero, the switching element 5 operates at the fixed switching frequency fsw_max. Therefore, in a low-load condition, the ratio of switching loss to the entire loss increases, leading to reduction in power conversion efficiency.

In this regard, in the present embodiment, as shown in FIG. 3C and FIG. 3D, the switching frequency (fsw theoretical value in FIG. 3C) in a case where the magnetic flux density B of the magnetic core of the power factor correction reactor 3 becomes a set value (B theoretical value in FIG. 3D) not greater than a maximum value Bmax, is calculated through feedback calculation on the basis of Expression (2). That is, in addition to feedback control of the duty cycle duty, the switching frequency fsw with which the magnetic flux density B of the magnetic core of the power factor correction reactor 3 determined by Expression (2) becomes a set value not greater than the maximum value Bmax, is derived through feedback calculation.

Here, the switching frequency fsw of the switching element 5 instantaneously and dynamically changes in a half cycle of the phase of the input voltage Vin.

Accordingly, in the present embodiment, in order to achieve stable change of the switching frequency fsw of the switching element 5, on the basis of the above derived switching frequency (fsw theoretical value in FIG. 3C) with which the magnetic flux density B of the magnetic core of the power factor correction reactor 3 becomes a set value not greater than the maximum value Bmax, control is performed so that the switching frequency fsw changes stepwise in each of M intervals (M is an integer not less than 2) on the basis of a half cycle of the phase of the input voltage Vin.

Specifically, as shown in FIG. 3E, a half cycle of the phase of the input voltage Vin is divided into M intervals, and the switching frequency fsw in each interval takes a value calculated so that the magnetic flux density B of the magnetic core of the power factor correction reactor 3 becomes a set value not greater than the maximum value Bmax, at a temporal start point of each interval.

Here, if the switching frequency of the switching element 5 is set to zero when the input voltage Vin is zero, from the relation of Expression (2), the magnetic flux density of the magnetic core of the power factor correction reactor 3 diverges to infinity in theory. Therefore, in the vicinity of a zero-cross point of the input voltage Vin, the switching frequency fsw of the switching element 5 is set to be a frequency that is not zero and is smaller than the switching frequency fsw when the input voltage Vin becomes maximum. For example, a minimum value fsw_min of the switching frequency of the switching element 5 as shown in FIG. 3E is set as a lower limit value, and control is performed so that the switching frequency fsw becomes the minimum value fsw_min of the switching frequency in the vicinity of a zero-cross point, whereby divergence of the magnetic flux density B can be suppressed. It is noted that the increase/decrease relationship between the switching frequency fsw and the magnetic flux density B of the magnetic core of the power factor correction reactor 3 is not limited to that shown here.

In the above description, the switching frequency (fsw theoretical value in FIG. 3C) is derived through feedback calculation on the basis of Expression (2). However, feedforward calculation may be used in addition to feedback calculation. That is, feedforward calculation using the following Expression (3) may be added to derive the switching frequency fsw of the switching element 5 with which the magnetic flux density of the power factor correction reactor 3 becomes a set value, thus controlling the switching frequency fsw.

Specifically, the input voltage Vin obtained from the first voltage detector 71, the output voltage Vout obtained from the second voltage detector 72, the number N oi turns of the power factor correction reactor 3, the effective sectional area Ae of the magnetic core, and a predetermined command value Bref for the magnetic flux density of the magnetic core, are substituted into Expression (3), to obtain a feedforward calculation term, and the feedforward calculation term is added to a feedback control calculation term of feedback control, to derive the switching frequency fsw with which the magnetic flux density B of the magnetic core of the power factor correction reactor 3 becomes a set value not greater than the maximum value Bmax. Then, the switching frequency fsw is controlled so as to change stepwise in each of M intervals (M is a given integer) on the basis of a half cycle of the phase of the input voltage Vin. The output voltage Vout is not limited to a detection value obtained from the second voltage detector 72, and in a case where a control command value is provided, the control command value may be used.

The switching frequency fsw (fsw theoretical value in FIG. 3C) may be derived using only the above feedforward calculation, instead of being derived using the feedback calculation.

[Mathematical 3]

$$f_{sw} = \frac{1}{Bref} \cdot \frac{|Vin|}{2 \cdot N \cdot A_e} \cdot \frac{Vout - |Vin|}{Vout} \quad (3)$$

In the present embodiment, as shown in FIG. 3F, a control frequency fcont in the controller 9 is controlled to have the same phase as the switching frequency fsw, and is set at a value obtained by dividing the switching frequency fsw by an integer P (P is an integer not less than 2). Thus, the control frequency fcont can be made to be 1/P of the switching frequency fsw. Therefore, in such cases where the maximum value of the required switching frequency fsw is high, where complicated control processing is required, and where a plurality of power conversion devices are controlled by one controller (microcomputer), it is possible to reduce the processing load of the controller (microcomputer).

In the example shown in FIG. 3F, the integer P is set to be constant. However, the integer P is not limited thereto. For example, the integer P may be changed in each of the M divided intervals or in each AC cycle. In this case, it suffices that the integer P is not less than 2 in at least a part of the intervals, and even if the integer P is set at 1 in the other intervals, an effect of reducing the processing load of the controller (microcomputer) is obtained. Also in embodiments 2 to 5 described later, the integer P is not limited to a constant value and may be set to not less than 2 in at least a part of the intervals.

As shown in FIG. 3F, by setting the control frequency fcont in the controller 9 to a value obtained by dividing the switching frequency fsw by the integer P, it is possible to constantly synchronize the switching frequency fsw and the control frequency fcont with each other. Thus, for example, in a case of performing feedback calculation using, as a feedback quantity, a current difference between a detection value of AC input current Iin and a predetermined sinusoidal input current command (target sinusoidal current) Iin* synchronized with a detection value of the AC input voltage Vin obtained from the first voltage detector 71, control is performed using a value detected always at the same timing relative to current ripple of the AC input current Iin. Therefore, even in a case where the switching frequency fsw changes at each time in accordance with the operation condition, reduction in controllability can be prevented.

In the example shown in FIG. 3, since the output voltage Vout has a constant value, the duty cycle duty may be calculated using a detection value of the input voltage Vin. Conversely, in a case where the input voltage Vin has a known constant value, the duty cycle duty may be calculated using a detection value of the output voltage Vout. In a case where both of the input voltage Vin and the output voltage Vout dynamically change, the duty cycle duty may be calculated using detection values of both voltages.

[Explanation of Operation Modes]

Operation modes of the AC/DC converter 10 are classified into a constant power control mode (hereinafter, referred to as CP control mode) and a constant current control mode (hereinafter, referred to as CC control mode), in accordance with control methods.

Specifically, in the CP control mode, the controller 9 calculates a current difference between a detection value of the AC input current Iin and the predetermined sinusoidal input current command (target sinusoidal current) Iin* synchronized with a detection value of the AC input voltage Vin obtained from the first voltage detector 71. Using the calculated current difference as a feedback quantity, calculation is performed through proportional control or proportional integral control, to output the duty cycle duty_fb relevant to power factor control.

On the other hand, in the CC control mode, the controller 9 calculates a voltage difference between a predetermined output voltage command (target DC voltage) Vout* and a detection value of the DC output voltage Vout. Using the calculated voltage difference as a feedback quantity, calculation is performed through proportional control or proportional integral control, to output the duty cycle duty_fb relevant to voltage control.

[Explanation of Setting Method for Control Gain (Control Constant)]

For the proportional control or the proportional integral control in the CP control mode and the CC control mode described above, a control gain (control constant) is set on the basis of one of the control frequency fcont calculated by the above method and a detection value of the input current Iin obtained from the first current detector 73.

Specifically, the control gain (control constant) is set so that response of the power conversion device becomes higher as the control frequency fcont increases, and the control gain (control constant) is set so that response of the power conversion device becomes lower as the control frequency fcont decreases.

In addition, as a detection value of the input current Iin obtained from the first current detector 73 increases, an inductance L of the power factor correction reactor 3 decreases, and therefore the control gain (control constant) is set so that response of the power conversion device becomes lower. As a detection value of the input current Tin obtained from the first current detector 73 decreases, the inductance L of the power factor correction reactor 3 increases, and therefore the control gain (control constant) is set so that response of the power conversion device becomes higher.

Thus, it is possible to achieve optimum feedback calculation in accordance with the operation condition of the power conversion device.

Effects of Embodiment 1

As described above, according to the present embodiment, the power converter is an AC/DC converter for converting AC voltage to DC voltage, the AC/DC converter includes a reactor as the magnetic component, and in the controller, the switching frequency is determined on the basis of a frequency derived so that a magnetic flux density of a magnetic core of the reactor as the magnetic parameter of the magnetic component becomes a set value, and the switching frequency changes stepwise in each of the M intervals on the basis of a half cycle of an input AC voltage phase as the time width, M being an integer not less than 2.

Thus, although iron loss of the reactor is fixed, switching loss of the switching element which occupies a major part of loss in the power conversion device can be reduced. In addition, stable change of the switching frequency can be achieved.

In addition, the controller determines the switching frequency so as to satisfy the above Expression (3), using a command value Bref for the magnetic flux density of the magnetic core of the reactor, a number N of turns of the reactor, an effective sectional area Ae of the magnetic core of the reactor, an input voltage detection value Vin of the power converter, and an output voltage detection value Vout of the power converter.

Thus, although iron loss of the reactor is fixed, switching loss of the switching element which occupies a major part of loss in the power conversion device can be reduced.

In addition, the controller performs feedback control so that input current of the power converter follows sinusoidal current synchronized with input voltage of the power converter, to calculate the duty cycle for the switching element.

Thus, it is possible to supply power from the AC power supply to the DC load while performing power factor control.

In addition, the controller performs feedback control so that output voltage of the power converter follows target output voltage, to calculate the duty cycle for the switching element.

Thus, it is possible to supply power from the AC power supply to the DC load while performing voltage control.

In addition, the controller sets a control constant for the feedback control on the basis of one of the control frequency and input current of the power converter.

Thus, it is possible to perform optimum feedback calculation in accordance with the operation condition of the power conversion device.

Embodiment 2

In embodiment 1, the control method for the switching frequency and the control frequency with respect to the magnetic flux density B of the magnetic core of the reactor 3, has been described. In embodiment 2, a control method for the switching frequency and the control frequency with respect to current ripple (pulsation) of the reactor 3 will be described.

The circuit configuration of the power conversion device is the same as the circuit configuration shown in FIG. 1 and FIG. 2 in embodiment 1, and therefore the description thereof is omitted.

[Explanation of Operation Based on Current Ripple Constant Control]

Figure 4:
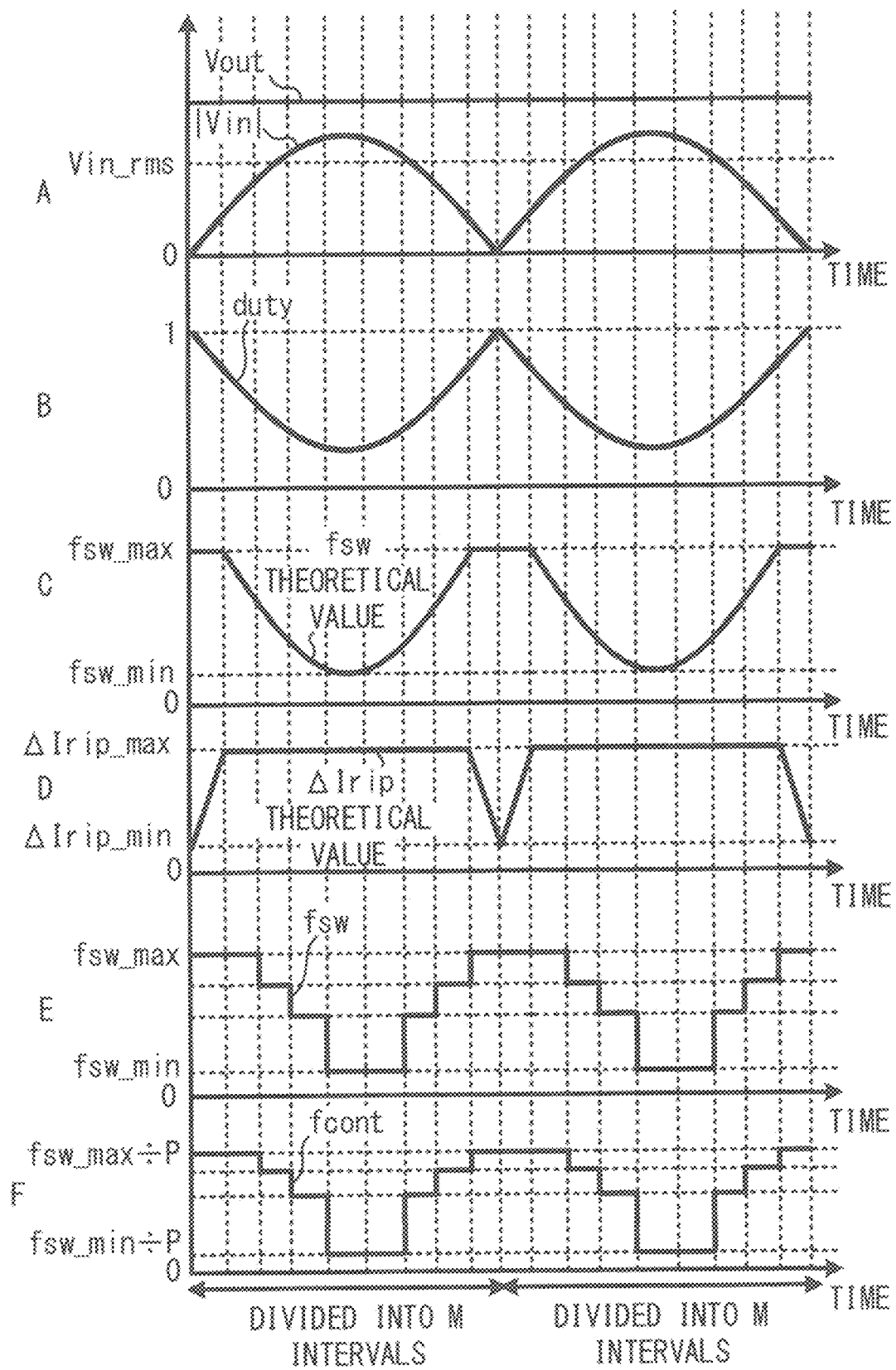
FIG. 4 is an operation waveform diagram in a power conversion device according to embodiment 2.

FIG. 4 is an operation waveform diagram illustrating the switching frequency and the control frequency in the AC/DC converter 10 and the controller 9 in the present embodiment, and shows operation in one cycle of the AC power supply 1.

In FIG. 4A, the instantaneous value of the input voltage Vin from the AC power supply 1 (an output value of the first voltage detector 71) is full-wave rectified via the input-side diode rectification bridge circuit 2, so as to become input voltage |Vin|. The output voltage Vout of the AC/DC converter 10 (an output value of the second voltage detector 72) is DC voltage Vout having a constant value as shown in FIG. 4A. In FIG. 4A, Vin_rms indicates the effective value of the input voltage Vin.

In FIG. 4B, the duty cycle duty for the switching element 5 changes so as to become 1 at a phase where the input voltage Vin is zero, and become minimum at a phase where the input voltage Vin has a peak value. This operation can be represented by the above Expression (1). The duty cycle duty for the switching element 5 is determined on the basis of the duty cycle duty_vt obtained by Expression (1) and the duty cycle duty_fb calculated through feedback calculation. Control for calculating the duty cycle duty for the switching element 5 is the same as in embodiment 1.

Here, the instantaneous input current Iin obtained from the first current detector 73 has current ripple ΔIrip superimposed thereon, due to excitation and neutralization (reset) of the power factor correction reactor 3. The current ripple ΔIrip can be represented by the following Expression (4). In Expression (4), L is the inductance of the power factor correction reactor 3.

[Mathematical 4]

$$\Delta Irip = \frac{|Vin|}{L} \cdot \frac{duty}{fsw} \quad (4)$$

From Expression (4), in a case where the switching frequency fsw of the switching element 5 is fixed at a predetermined value, e.g., the switching frequency fsw_max, the current ripple changes with the phase of the input voltage Vin. In a case where the output voltage Vout is constant and the input current ripple ΔIrip is reduced as the input voltage Vin increases, even when the input current ripple becomes a minimum value ΔIrip_min, the switching element 5 operates at the above fixed switching frequency fsw_max. Therefore, in a low-load condition, the ratio of switching loss to the entire loss increases, leading to reduction in power conversion efficiency.

In this regard, in the present embodiment, a switching frequency (fsw theoretical value in FIG. 4C) with which the current ripple ΔIrip of the instantaneous input current Iin obtained from the first current detector 73 becomes a set value (ΔIrip theoretical value in FIG. 4D) not greater than a maximum value ΔIrip_max of the current ripple when operation is performed in a state fixed at the maximum value (fsw_max) of the switching frequency of the switching element 5 that is set, is derived through feedback calculation on the basis of Expression (4).

That is, in addition to feedback control of the duty cycle duty, the switching frequency fsw (fsw theoretical value in FIG. 4C) with which the current ripple ΔIrip of the input current Iin determined by Expression (4) becomes a set value (ΔIrip theoretical value in FIG. 4D) is derived through feedback calculation.

In the fsw theoretical value in FIG. 4C, the switching frequency fsw of the switching element 5 instantaneously and dynamically changes in a half cycle of the phase of the input voltage Vin.

Accordingly, in the present embodiment, in order to achieve stable change of the switching frequency of the switching element 5, on the basis of the above derived switching frequency with which the current ripple ΔIrip of the input current Iin becomes a set value, control is performed so that the switching frequency changes stepwise in each of M intervals (M is an integer not less than 2) on the basis of a half cycle of the phase of the input voltage Vin.

Specifically, as shown in FIG. 3E, a half cycle of the phase of the input voltage Vin is divided into M intervals, and the switching frequency fsw in each interval takes a value calculated so that the current ripple ΔIrip of the input current Iin becomes a set value, at a temporal start point of each interval.

[Explanation of Feedforward Control in Embodiment 2]

Not only using the feedback calculation based on Expression (4), feedforward calculation using the following Expression (5) may be added to derive the switching frequency fsw of the switching element 5 with which the current ripple ΔIrip of the input current Iin becomes a set value, thus controlling the switching frequency fsw.

Specifically, the input voltage Vin obtained from the first voltage detector 71, the output voltage Vout obtained from the second voltage detector 72, the inductance L of the power factor correction reactor 3, and a predetermined command value ΔIrip_ref for the input current ripple are substituted into Expression (5), to obtain a feedforward calculation term, and the feedforward calculation term is added to the feedback control calculation term of the feedback control described above, to derive the switching frequency fsw with which the current ripple ΔIrip of the input current Iin becomes a set value. Then, the switching frequency fsw is controlled so as to change stepwise in each of M intervals on the basis of a half cycle of the phase of the input voltage Vin. The output voltage Vout is not limited to a detection value obtained from the second voltage detector 72, and in a case where a control command value is provided, the control command value may be used.

The switching frequency (fsw theoretical value in FIG. 4C) may be derived using only the feedforward calculation based on Expression (5), instead of being derived using the feedback calculation.

[Mathematical 5]

$$f_{sw} = \frac{|Vin|}{L \cdot \Delta Irip\_ref} \cdot \frac{Vout - |Vin|}{Vout} \quad (5)$$

The operation modes of the AC/DC converter 10 and the setting method for the control gain (control constant) are the same as in embodiment 1, and therefore the description thereof is omitted.

The present embodiment has shown the example in which current ripple of input current of the power converter is used as an electric parameter of the power converter. However, current ripple of output current of the power converter may be used.

Effects of Embodiment 2

As described above, according to the present embodiment, the power converter is an AC/DC converter for converting AC voltage to DC voltage, the AC/DC converter includes a reactor as the magnetic component, and in the controller, the switching frequency is determined on the basis of a frequency derived so that current ripple of input current of the power converter as the electric parameter of the power converter becomes a set value, and the switching frequency changes stepwise in each of the M intervals on the basis of a half cycle of an input AC voltage phase as the time width, M being an integer not less than 2.

Thus, switching loss of the switching element which occupies a major part of loss in the power conversion device can be reduced. In addition, stable change of the switching frequency can be achieved.

In addition, the controller determines the switching frequency so as to satisfy the above Expression (5), using a command value ΔIrip_ref for the current ripple of the input current, an inductance L of the reactor, an input voltage detection value Vin of the power converter, and an output voltage detection value Vout of the power converter.

Thus, switching loss of the switching element which occupies a major part of loss in the power conversion device can be reduced.

In addition, the controller performs feedback control so that input current of the power converter follows sinusoidal current synchronized with input voltage of the power converter, to calculate the duty cycle for the switching element.

Thus, it is possible to supply power from the AC power supply to the DC load while performing power factor control.

In addition, the controller performs feedback control so that output voltage of the power converter follows target output voltage, to calculate the duty cycle for the switching element.

Thus, it is possible to supply power from the AC power supply to the DC load while performing voltage control.

In addition, the controller sets a control constant for the feedback control on the basis of one of the control frequency and input current of the power converter.

Thus, it is possible to perform optimum feedback calculation in accordance with the operation condition of the power conversion device.

Embodiment 3

[Explanation of Circuit Configuration in Embodiment 3]

Figure 5:
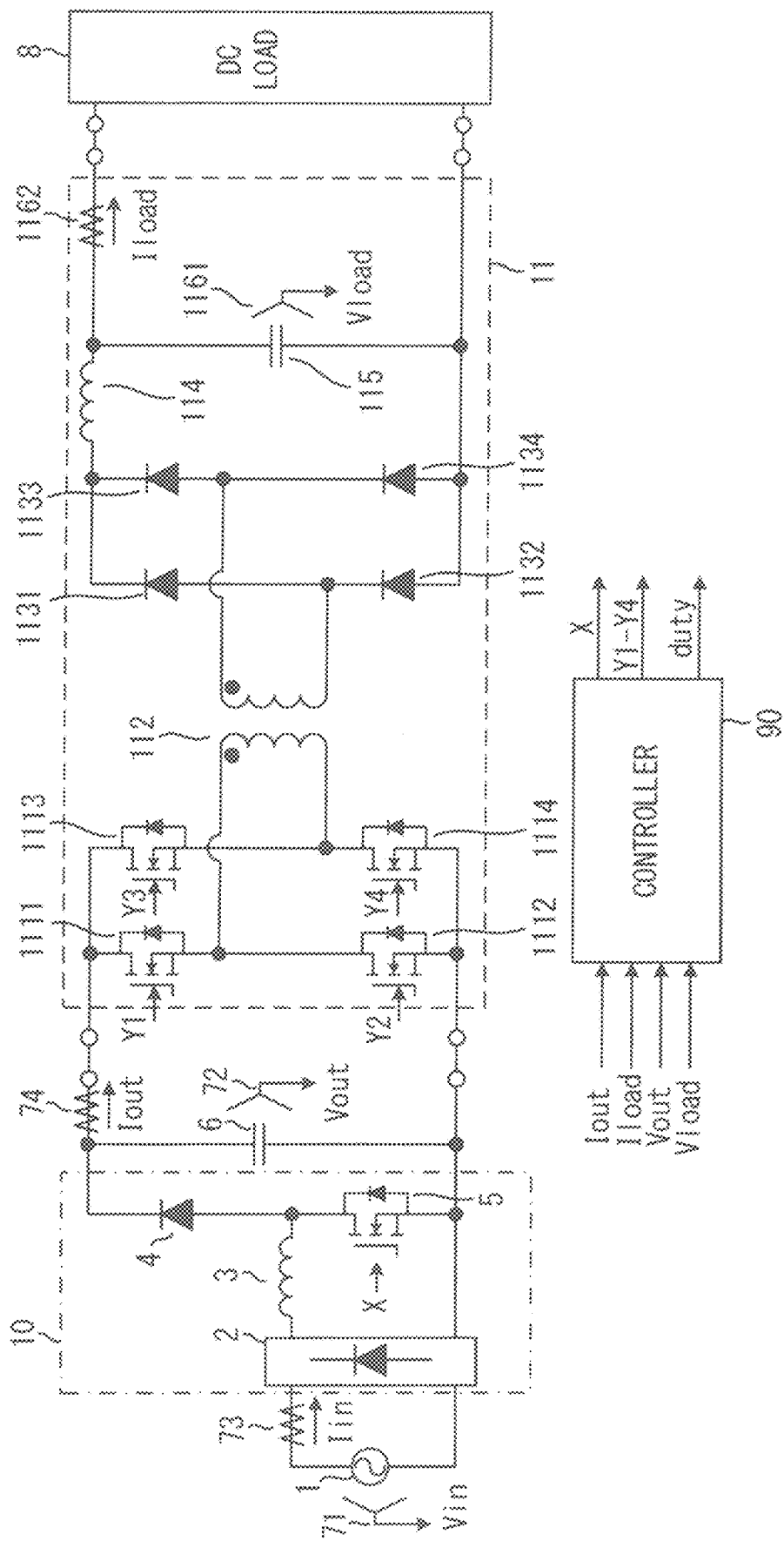
FIG. 5 shows an example of a circuit configuration of a power conversion device according to embodiment 3.

FIG. 5 shows an example of a circuit configuration diagram of a power conversion device according to embodiment 3, in which an isolation DC/DC converter 11 is interposed between the DC load 8 and output terminals of the AC/DC converter 10 described in embodiment 1.

The configuration of the AC/DC converter 10 is the same as that in embodiment 1 (FIG. 1), i.e., includes the input-side diode rectification bridge circuit 2, the power factor correction reactor 3, the diode element 4, and the switching element 5. The details thereof have been described in embodiment 1.

The isolation DC/DC converter 11 includes a primary-side inverter circuit composed of switching elements 1111, 1112, 1113, 1114, an isolation transformer 112, a secondary-side rectification circuit composed of diode elements 1131, 1132, 1133, 1134, a smoothing reactor 114, a smoothing capacitor 115, a load voltage detector 1161 for detecting load voltage Vload, and a load current detector 1162 for detecting load current Iload.

The switching elements 1111 to 1114 composing the primary-side inverter of the isolation DC/DC converter 11 are not limited to IGBTs or MOSFETs, and may be SiC-MOSFETs, GaN-FETs, GaN-HEMTs, or Ga2O3-MOSFETs. The secondary-side rectification circuit is not limited to a rectification bridge circuit formed by diodes as shown in FIG. 5, and may be a synchronous rectification circuit using switching elements such as MOSFETs instead of diodes.

As shown in FIG. 5, in a case where the isolation DC/DC converter 11 is connected at a stage preceding the DC load 8, the controller 90 performs control calculation per control cycle determined by a control frequency, on the basis of at least one or all of detection values obtained from the second voltage detector 72, the load voltage detector 1161, the second current detector 74, and the load current detector 1162.

The controller 90 performs control of the switching elements 1111 to 1114. That is, the controller 90 transmits driving signals Y1 to Y4 to the gates of the switching elements 1111 to 1114 on the basis of at least one or all of detection values obtained from the second voltage detector 72, the load voltage detector 1161, the second current detector 74, and the load current detector 1162, to perform ON/OFF control of the switching elements 1111 to 1114, whereby desired operation can be performed.

In addition, as described later, the controller 9C performs appropriate feedback calculation in accordance with the operation mode of the power conversion device, thus outputting a duty cycle duty_fb and calculating a duty cycle duty for the switching elements 1111 to 1114.

In the present embodiment, as the power converter, the isolation DC/DC converter 11 is a control target. Therefore, the voltage Vout detected by the second voltage detector 72 is input voltage Vout of the power converter, the current Iout detected by the second current detector 74 is input current Iout of the power converter, the voltage Vload detected by the load voltage detector 1161 is output voltage Vload of the power converter, and the current Iload detected by the load current detector 1162 is output current Iload of the power converter.

[Explanation of Operation Based on Magnetic Flux Density Constant Control]

In embodiment 3, a case of performing control for the switching frequency of the switching elements 1111 to 1114 and the control frequency in the controller 90 with respect to the magnetic flux density 3 of the magnetic core of the isolation transformer 112 composing the isolation DC/DC converter 11, will be described. In embodiment 3, the change amounts of the output voltage Vout of the AC/DC converter 10 (input voltage Vout of the DC/DC converter 11) and the load voltage Vload of the DC/DC converter 11 (output voltage Vload of the DC/DC converter 11) are regarded as zero, that is, the output voltage Vout and the load voltage Vload are regarded as constant values.

Figure 6:
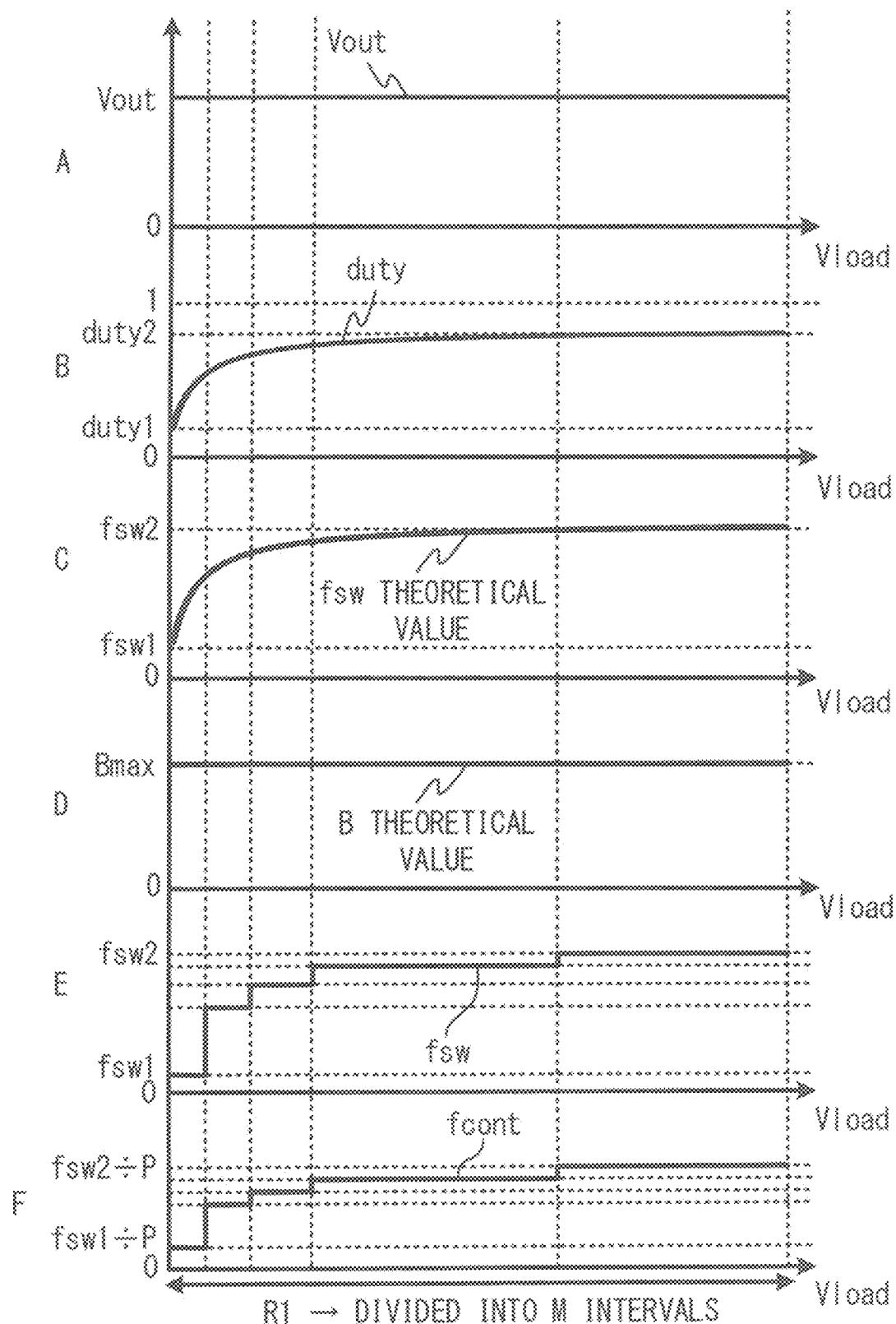
FIG. 6 is an operation waveform diagram of the power conversion device according to embodiment 3.

FIG. 6 is an operation waveform diagram illustrating the switching frequency and the control frequency in the isolation DC/DC converter 11 and the controller 9C in the present embodiment, and shows operation waveforms with respect to the load voltage (output voltage) Vload.

In FIG. 6A, the detection value Vout of the second voltage detector 72, i.e., the input voltage Vout of the isolation DC/DC converter 11, and the detection value Vload of the load voltage detector 1161, i.e., the output voltage Vload of the isolation DC/DC converter 11, are DC voltages having constant values.

In this case, as shown in FIG. 6B, the duty cycle duty for determining the driving signals Y1 to Y4 for the switching elements 1111 to 1114 becomes the minimum value when the load voltage (output voltage) Vload is minimum, and becomes the maximum value when the load voltage (output voltage) Vload is maximum. This operation can be represented by the following Expression (6). The duty cycle duty for the switching elements 1111 to 1114 is determined on the basis of the duty cycle duty_vt obtained by Expression (6) and the duty cycle duty_fb calculated through feedback calculation. Specifically, using the duty cycle duty_fb as a feedback term and the duty cycle duty_vt as a feedforward term, control is performed so that only the feedback term or the sum of the feedback term and the feedforward term becomes the duty cycle duty for the switching element 5.

[Mathematical 6]

$$\text{duty\_vt} = \frac{Vload - Vout}{Vload} \quad (6)$$

The magnetic flux density B of the magnetic core of the isolation transformer 112 is represented by the following Expression 7). In Expression (7), N is the number of turns of the isolation transformer 112, Ae is the effective sectional area of the magnetic core of the isolation transformer 112 and fsw is the switching frequency of the switching elements 1111 to 1114.

[Mathematical 7]

$$B = \frac{Vout}{4 \cdot N \cdot Ae} \cdot \frac{\text{duty}}{fsw} \quad (7)$$

Here, it is assumed that the input voltage Vout of the isolation DC/DC converter 11 is constant, the switching frequency fsw is fixed at a predetermined maximum value fsw_max, and the magnetic flux density of the magnetic core of the isolation transformer 112 is reduced as the output voltage Vload of the isolation DC/DC converter 11 is reduced. In this case, even when the magnetic flux density B of the magnetic core of the isolation transformer 112 becomes the minimum value, the switching elements 1111 to 1114 operate at the fixed switching frequency fsw_max. Therefore, in a low-load condition, the ratio of switching loss to the entire loss increases, leading to reduction in power conversion efficiency.

Accordingly, in the present embodiment, as shown in FIG. 6C and FIG. 6D, the switching frequency of the switching elements 1111, 1112, 1113, 1114 is derived (fsw theoretical value in FIG. 6C) through feedback calculation on the basis of Expression (7) so that the magnetic flux density B of the magnetic core of the isolator, transformer 112 becomes a set value (in this example, the maximum value Bmax of the magnetic flux density; B theoretical value in FIG. 6D) not greater than the maximum value Bmax. That is, in addition to feedback control of the duty cycle duty, the switching frequency fsw with which the magnetic flux density B of the magnetic core of the isolation transformer 112 determined by Expression (7) becomes a set value not greater than the maximum value Bmax, is derived through feedback calculation.

Further, in the present embodiment, in order to achieve stable change of the switching frequency of the switching elements 1111 to 1114, on the basis of the above derived switching frequency (fsw theoretical value in FIG. 6D) with which the magnetic flux density B of the magnetic core of the isolation transformer 112 becomes a set value not greater than the maximum value Bmax, control is performed so that the switching frequency changes stepwise in each of M intervals (M is an integer not less than 2) on the basis of an operation range R1 of the load voltage Vload.

Specifically, the operation range R1 of the output voltage (load voltage) Vload is divided into M intervals, and the switching frequency fsw in each interval takes a value calculated so that the magnetic flux density B of the magnetic core of the isolation transformer 112 becomes a set value not greater than the maximum value Bmax, at any load voltage Vload in each interval.

In the above description, the switching frequency (fsw theoretical value in FIG. 6C) is derived through feedback calculation on the basis of Expression (7). However, feedforward calculation may be used in addition to feedback calculation. That is, feedforward calculation using the following Expression (8) may be added to derive the switching frequency fsw of the switching elements 1111 to 1114 with which the magnetic flux density of the isolation transformer 112 becomes a set value, thus controlling the switching frequency fsw.

Specifically, the input voltage Vout obtained from the second voltage detector 72, the output voltage (load voltage) Vload obtained from the load voltage detector 1161, the number N of turns of the isolation transformer 112, the effective sectional area Ae of the magnetic core, and a predetermined command value Bref for the magnetic flux density of the magnetic core are substituted into Expression (8), to obtain a feedforward calculation term, and the feedforward calculation term is added to the feedback control calculation term of the feedback control described above, to derive the switching frequency fsw with which the magnetic flux density B of the magnetic core of the isolation transformer 112 becomes a set value not greater than the maximum value Bmax. Then, the switching frequency fsw is controlled so as to change stepwise in each of M intervals (M, is an integer not less than 2) on the basis of the operation range R1 of the output voltage (load voltage) Vload. The output voltage (load voltage) Vload is not limited to a detection value obtained from the load voltage detector 1161, and in a case where a control command value is provided, the control command value may be used.

The switching frequency (fsw theoretical value in FIG. 6C) may be derived using only the above feedforward calculation, instead of being derived using the feedback calculation.

[Mathematical 8]

$$f_{sw} = \frac{1}{B_{ref}} \cdot \frac{Vout}{4 \cdot N \cdot Ae} \cdot \frac{Vload - Vout}{Vload} \quad (8)$$

in the present embodiment, as shown in FIG. 6F, the control frequency fcont in the controller 90 is controlled to have the same phase as the switching frequency fsw, and is set at a value obtained by dividing the switching frequency fsw by an integer P (P is an integer not less than 2). Thus, the control frequency fcont can be made to be 1/P of the switching frequency fsw. Therefore, in such cases where the maximum value of the required switching frequency is high, where complicated control processing is required, and where a plurality of power conversion devices are controlled by one controller (microcomputer), is possible to reduce the processing load of the controller (microcomputer).

Further, as shown in FIG. 6F, by setting the control frequency fcont in the controller 90 to a value obtained by dividing the switching frequency by the integer P not less than 2, it is possible to constantly synchronize the switching frequency and the control frequency with each other. Thus, for example, in a case of performing feedback calculation using, as a feedback quantity, a current difference between a load current command Iload* and a detection value of the load current Iload, control is performed using a value detected always at the same timing relative to current ripple of the load current Iload. Therefore, even in a case where the switching frequency changes at each time in accordance with the operation condition, reduction in controllability can be prevented.

In the example shown in FIG. 6, since the output voltage (load voltage) Vload has a constant value, the duty cycle duty may be calculated using a detection value of the input voltage Vout of the isolation DC/DC converter 11 (output voltage Vout of the AC/DC converter 10). Conversely, in a case where the input voltage Vout of the isolation DC/DC converter 11 (output voltage Vout of the AC/DC converter 10) has a known constant value, the duty cycle duty may be calculated using a detection value of the output voltage (load voltage) Vload. In a case where both of the input voltage Vout and the output voltage (load voltage) Vload of the isolation DC/DC converter 11 dynamically change, the duty cycle duty may be calculated using detection values of both voltages.

[Explanation of Operation Modes]

Operation modes of the isolation DC/DC converter 11 are classified into a constant power control mode (hereinafter, referred to as CP control mode) and a constant current control mode (hereinafter, referred to as CC control mode), in accordance with control methods.

Specifically, in the CP control mode, the controller 90 calculates a voltage difference between a predetermined output voltage command Vout* for the AC/DC converter 10, i.e., an input voltage command Vout* for the isolation DC/DC converter 11, and a detection value of the output voltage Vout of the AC/DC converter 10, i.e., a detection value of the input voltage Vout of the isolation DC/DC converter 11. Using the calculated voltage difference as a feedback quantity, calculation is performed through proportional control or proportional integral control, to output the duty cycle duty_fb relevant to voltage control.

Meanwhile, in the CC control mode, the controller 90 calculates a current difference between a predetermined load current command (output current command) Iload* and a detection value of the load current (output current) Iload. Using the calculated current difference as a feedback quantity, calculation is performed through proportional control or proportional integral control, to output the duty cycle duty_fb relevant to current control.

[Explanation of Setting Method for Control Gain (Control Constant)]

For the proportional control or the proportional integral control in the CP control mode and the CC control mode described above, a control gain (control constant) is set on the basis of one of the control frequency fcont calculated by the above method and a detection value of the load current (output current) Iload obtained from the load current detector 1162.

Specifically, the control gain (control constant) is set so that response of the power conversion device becomes higher as the control frequency fcont increases, and the control gain (control constant) is set so that response of the power conversion device becomes lower as the control frequency fcont decreases. In addition, as a detection value of the load current (output current) Iload obtained from the load current detector 1162 increases, an inductance L of the isolation transformer 112 decreases, and therefore the control gain (control constant) is set so that response of the power conversion device becomes lower. As a detection value of the load current (output current) Iload obtained from the load current detector 1162 decreases, the inductance L of the isolation transformer 112 increases, and therefore the control gain (control constant) is set so that response of the power conversion device becomes higher.

Thus, it is possible to achieve optimum feedback calculation in accordance with the operation condition of the power conversion device.

In the above description, the DC/DC converter includes a transformer as a magnetic component, and the switching frequency is determined on the basis of a frequency derived so that the magnetic flux density of the magnetic core of the transformer as a magnetic parameter of the magnetic component becomes a set value. However, the DC/DC converter may include a reactor as a magnetic component, and the switching frequency may be determined on the basis of a frequency derived so that the magnetic flux density of the reactor as a magnetic parameter of the magnetic component becomes a set value.

Effects of Embodiment 3

As described above, according to the present embodiment, the power converter is a DC/DC converter for converting DC voltage to DC voltage, the DC/DC converter includes at least one of a reactor or a transformer as the magnetic component, and in the controller, the switching frequency is determined on the basis of a frequency derived sc that a magnetic flux density of a magnetic core of the reactor or the transformer as the magnetic parameter of the magnetic component becomes a set value, and the switching frequency changes stepwise in each of the M intervals on the basis of an operation range of output voltage of the power converter as the electric quantity width, M being an integer not less than 2.

Thus, although iron loss of the reactor or the transformer is fixed, switching loss of the switching element which occupies a major part of loss in the power conversion device can be reduced.

In addition, the controller determines the switching frequency so as to satisfy the above Expression (8), using a command value Bref for the magnetic flux density of the magnetic core of the reactor or the transformer, a number N of turns of the reactor or the transformer, an effective sectional area Ae of the magnetic core of the reactor or the transformer, an input voltage detection value Vout of the power converter, and an output voltage detection value Vload of the power converter.

Thus, although iron loss of the reactor or the transformer is fixed, switching loss of the switching element which occupies a major part of loss in the power conversion device can be reduced.

In addition, the controller performs feedback control so that input voltage of the power converter follows target input voltage, to calculate the duty cycle for the switching element.

Thus, it is possible to perform conversion from DC power to DC power while performing voltage control.

In addition, the controller performs feedback control so that output current of the power converter follows target output current, to calculate the duty cycle for the switching element.

Thus, it is possible to perform conversion from DC power to DC power while performing current control.

In addition, the controller sets a control constant for the feedback control on the basis of one of the control frequency and output current of the power converter.

Thus, it is possible to perform optimum feedback calculation in accordance with the operation condition of the power conversion device.

Embodiment 4

In embodiment 3, the method for performing control for the switching frequency and the control frequency with respect to the magnetic flux density B of the magnetic core of the isolation transformer composing the isolation DC/DC converter 11, has been described. In embodiment 4, a method for performing control for the switching frequency and the control frequency with respect to ripple (pulsation) of output current of the isolation DC/DC converter 11 will be described.

The circuit configuration of the power conversion device is the same as the circuit configuration shown in FIG. 5 in embodiment 3, and therefore the description thereof is omitted.

Figure 7:
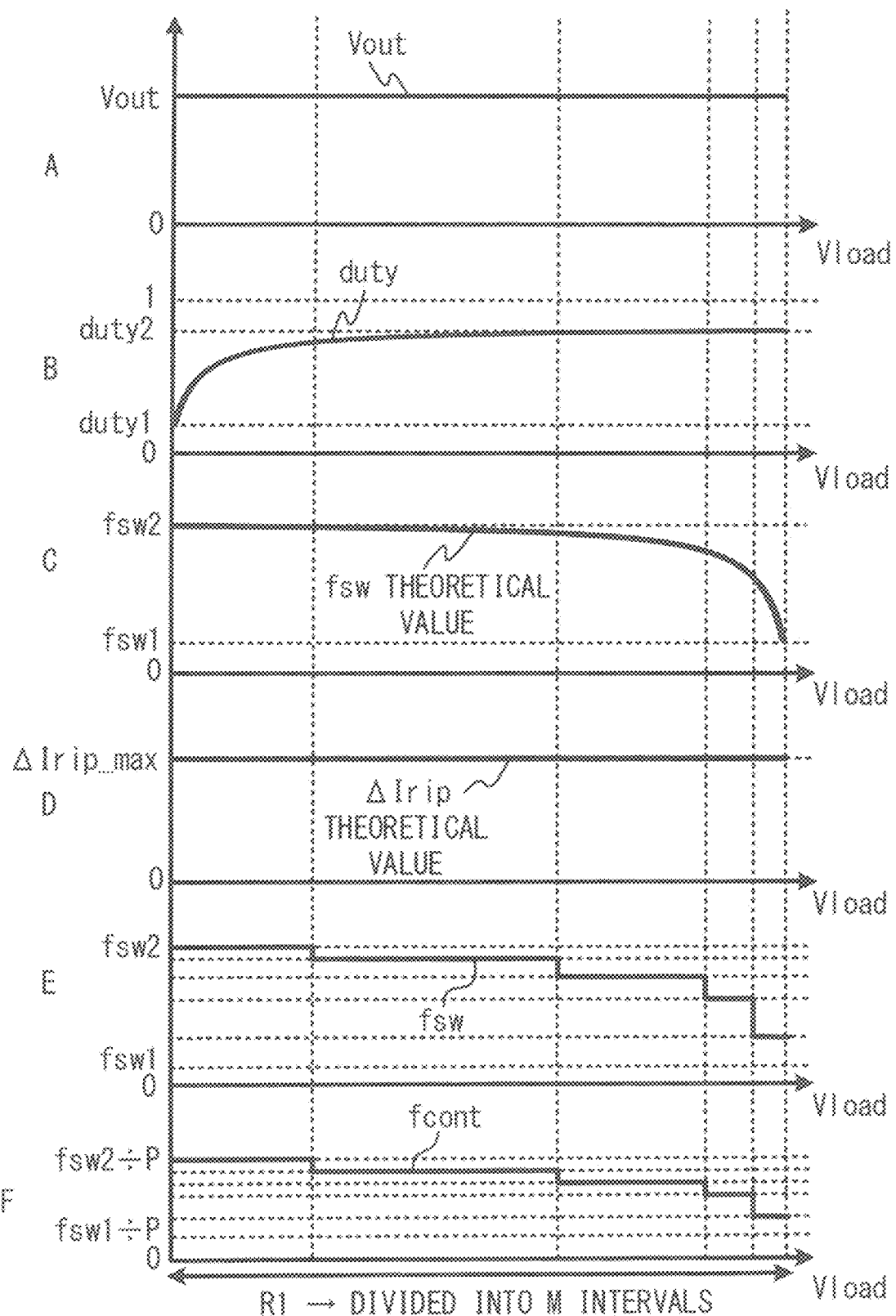
FIG. 7 is an operation waveform diagram of a power conversion device according to embodiment 4.

FIG. 7 is an operation waveform diagram illustrating the switching frequency and the control frequency in the power conversion device of the present embodiment, and shows operation waveforms with respect to the load voltage (output voltage) Vload.

In FIG. 7A, the detection value Vout of the second voltage detector 72, i.e., the input voltage Vout of the isolation DC/DC converter 11, and the detection value Vload of the load voltage detector 1161, i.e., the output voltage Vload of the isolation DC/DC converter 11, are DC voltages having constant values.

In this case, as shown in FIG. 7B, the duty cycle duty for determining the driving signals Y1 to Y4 for the switching elements 1111 to 1114 becomes the minimum value when the load voltage (output voltage) Vload is minimum, and becomes the maximum value when the load voltage (output voltage) Vload is maximum. This operation can be represented by the above Expression (6). The duty cycle duty for the switching elements 1111 to 1114 is determined on the basis of the duty cycle duty_vt obtained by Expression (6) and the duty cycle duty_fb calculated through feedback calculation. The control for calculating the duty cycle duty for the switching elements 1111 to 1114 is the same as in embodiment 3.

The load current (output current) Iload obtained from the load current detector 1162 has current ripple ΔIrip superimposed thereon, due to excitation and reset (neutralization) of the isolation transformer 112. The current ripple ΔIrip can be represented by the following Expression (9). In Expression (9), L is the inductance of the isolation transformer 112.

[Mathematical 9]

$$\Delta Irip = \frac{Vout}{L} \cdot \frac{duty}{2 \cdot fsw} \quad (9)$$

From Expression (9), in a case where the switching frequency fsw of the switching elements 1111 to 1114 is fixed at a predetermined value, the current ripple changes with the load voltage (output voltage) Vload. In a case where the output voltage Vout from the AC/DC converter 10, i.e., the input voltage Vout of the isolation DC/DC converter 11 is constant, and the load current (output current) ripple ΔIrip is reduced as the load voltage (output voltage) Vload is reduced, ever, when the load current (output current) ripple becomes a minimum value ΔIrip_min, the switching elements 1111 to 1114 operate at the fixed switching frequency. Therefore, in a low-load condition, the ratio of switching loss to the entire loss increases, leading to reduction in power conversion efficiency.

In this regard, in the present embodiment, a switching frequency (fsw theoretical value in FIG. 7C) with which the current ripple ΔIrip of the instantaneous load current Iload obtained from the load current detector 1162 becomes a set value (ΔIrip theoretical value in FIG. 7D) not greater than a maximum value ΔIrip_max of current ripple when operation is performed in a state fixed at the maximum value (fsw_max) of the switching frequency of the switching elements 1121 to 1114 that is set, is derived through feedback calculation on the basis of Expression (9).

That is, in addition to feedback control of the duty cycle duty, the switching frequency fsw (fsw theoretical value in FIG. 7C) with which the current ripple ΔIrip of the load current Iload determined by Expression (9) becomes a set value (ΔIrip theoretical value in FIG. 7D) is derived through feedback calculation.

Further, in the present embodiment, in order to achieve stable change of the switching frequency of the switching elements 1111 to 1114, on the basis of the switching frequency with which the above derived current ripple ΔIrip of the load current (output current) Ilead becomes a set value, control is performed so that the switching frequency changes stepwise in each of M intervals (M is an integer not less than 2) on the basis of the operation range R1 of the load voltage (output voltage) Vload.

Specifically, as shown in FIG. 7E, the operation range R1 of the load voltage (output voltage) Vload is divided into M intervals, and the switching frequency fsw in each interval takes a value calculated so that the current ripple ΔIrip of the load current (output current) Iload becomes a set value, at any load voltage (output voltage) Vload in each interval.

Not only using the feedback calculation based on Expression (9), feedforward calculation using the following Expression (10) may be added to derive the switching frequency fsw of the switching elements 1111 to 1114 with which the current ripple ΔIrip of the load current (output current) Iload becomes a set value, thus controlling the switching frequency fsw.

Specifically, the input voltage Vout of the isolation DC/DC converter 11 obtained from the second voltage detector 72, the load voltage (output voltage) Vload obtained from the load voltage detector 1161, the inductance L of the isolation transformer 112, and a predetermined command value ΔIrip_ref for the load current (output current) ripple are substituted into Expression (10), to obtain a feedforward calculation term, and the feedforward calculation term is added to a feedback control calculation term of the feedback control based on Expression (9), to derive the switching frequency fsw with which the current ripple ΔIrip of the load current (output current) Iload becomes a set value. Then, the switching frequency fsw is controlled so as to change stepwise in each of M intervals (M is an integer not less than 2) on the basis of the operation range R1 of the load voltage (output voltage) Vload. The load voltage (output voltage) Vload is not limited to a detection value obtained from the load voltage detector 1161, and in a case where a control command value is provided, the control command value may be used.

The switching frequency (fsw theoretical value in FIG. 7C) may be derived using only the feedforward calculation based on Expression (10), instead of being derived using feedback calculation.

[Mathematical 10]

$$f_{sw} = \frac{Vout}{2 \cdot L \cdot \Delta Irip\_ref} \cdot \frac{Vload - Vout}{Vload} \quad (10)$$

The operation modes of the isolation DC/DC converter 11 and the setting method for the control gain (control constant) are the same as in embodiment 3, and therefore the description thereof is omitted.

In the above description, the DC/DC converter includes a transformer as a magnetic component, and the switching frequency is determined on the basis of a frequency derived so that current ripple of output current of the power converter as an electric parameter of the power converter becomes a set value. However, the DC/DC converter may include a reactor as a magnetic component, and the switching frequency may be determined on the basis of a frequency derived so that current ripple of output current of the power converter as an electric parameter of the power converter becomes a set value.

The present embodiment has shown the example in which current ripple of output current of the power converter is used as an electric parameter of the power converter. However, current ripple of input current of the power converter may be used.

Effects of Embodiment 4

As described above, according to the present embodiment, the power converter is a DC/DC converter for converting DC voltage to DC voltage, the DC/DC converter includes at least one of a reactor or a transformer as the magnetic component, and in the controller, the switching frequency is determined on the basis of a frequency derived so that current ripple of output current of the power converter as the electric parameter of the power converter becomes a set value, and the switching frequency changes stepwise in each of the M intervals on the basis of an operation range of output voltage of the power converter as the electric quantity width, M being an integer not less than 2.

Thus, switching loss of the switching element which occupies a major part of loss in the power conversion device can be reduced.

In addition, the controller determines the switching frequency so as to satisfy the above Expression (10), using a command value ΔIrip_ref for the current ripple of the output current of the power converter, an inductance L of the reactor or the transformer, an input voltage detection value Vout of the power converter, and an output voltage detection value Vload of the power converter.

Thus, switching loss of the switching element which occupies a major part of loss in the power conversion device can be reduced.

In addition, the controller performs feedback control so that input voltage of the power converter follows target input voltage, to calculate the duty cycle for the switching element.

Thus, it is possible to perform conversion from DC power to DC power while performing voltage control.

In addition, the controller performs feedback control so that output current of the power converter follows target output current, to calculate the duty cycle for the switching element.

Thus, it is possible to perform conversion from DC power to DC power while performing current control.

In addition, the controller sets a control constant for the feedback control on the basis of one of the control frequency and output current of the power converter.

Thus, it is possible to perform optimum feedback calculation in accordance with the operation condition of the power conversion device.

Embodiment 5

The above embodiments 3 and 4 have shown the example in which the isolation DC/DC converter 11 is interposed between the DC load 8 and the output terminals of the AC/DC converter 10 described in embodiment 1. However, embodiments of the present disclosure are not limited thereto. That is, DC voltage may be provided at a stage before the isolation DC/DC converter 11, thus making a configuration having the isolation DC/DC converter alone. In addition, a chopper circuit using a reactor is also applicable, instead of using an isolation transformer.

In such a configuration as described above, other than the operation modes described in the above embodiments, there is a mode in which a voltage difference between a predetermined load voltage (output voltage) command Vload* and a detection value of the load voltage (output voltage) Vload is calculated, and using the calculated voltage difference as a feedback quantity, calculation is performed through proportional control or proportional integral control, to output the duty cycle duty_fb relevant to voltage control.

The calculation methods for the switching frequency fsw and the control frequency fcont, and the setting method for the control gain (control constant), are the same as in embodiments 1 to 4, and therefore the description thereof is omitted.

According to the present embodiment, in the configuration of performing power conversion from the DC power supply via the DC/DC converter, the controller performs feedback control so that the output voltage of the power converter follows target output voltage, to calculate the duty cycle for the switching element. Thus, it is possible to perform conversion from DC power to DC power while performing voltage control.

In addition, the controller sets a control constant for the feedback control on the basis of one of the control frequency and output current of the power converter.

Thus, it is possible to perform optimum feedback calculation in accordance with the operation condition of the power conversion device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 AC power supply
2 input-side diode rectification bridge circuit
3 power factor correction reactor
4 diode element
5 switching element
6 smoothing capacitor
71 first voltage detector
72 second voltage detector
73 first current detector
74 second current detector
8 DC load
9 controller
10 AC/DC converter
11 isolation DC/DC converter
112 isolation transformer
114 smoothing reactor
115 smoothing capacitor
1111, 1112, 1113, 1114 switching element
1161 load voltage detector
1162 load current detector

The invention claimed is:

1. A power conversion device comprising:
a power converter which includes a magnetic component and a switching element, and performs power conversion for converting an input voltage to an output voltage; and
a controller configured to perform ON/OFF control of the switching element, on the basis of a duty cycle for the switching element and a switching frequency for driving the switching element, under a control cycle determined by a control frequency, wherein
the controller is configured to:
set the switching frequency on the basis of at least one of a magnetic parameter of the magnetic component or an electric parameter of the power converter, and such that the switching frequency changes stepwise in each of M intervals on the basis of one of (i) a predetermined time width of the input voltage and or (ii) a predetermined electric quantity width of the output voltage, M being an integer not less than 2, and
set the control frequency to a value obtained by dividing the set switching frequency by an integer P not less than 2.

2. The power conversion device according to claim 1, wherein
the power converter is an AC/DC converter for converting AC voltage as the input voltage to DC voltage as the output voltage
the AC/DC converter includes a reactor as the magnetic component, and
the controller is configured to set the switching frequency is determined on the basis of a frequency derived so that a magnetic flux density of a magnetic core of the reactor as the magnetic parameter of the magnetic component becomes a set value, and such that the switching frequency changes stepwise in each of the M intervals on the basis of a half cycle of an input AC voltage phase as the predetermined time width, M being an integer not less than 2.

3. The power conversion device according to claim 2, wherein the controller is configured to set the switching frequency so as to satisfy Expression (A), using a command value Bref for the magnetic flux density of the magnetic core of the reactor, a number N of turns of the reactor, an effective sectional area Ae of the magnetic core of the reactor, an input voltage detection value Vin of the power converter, and an output voltage detection value Vout of the power converter.

$$f_{sw} = \frac{1}{B_{ref}} \cdot \frac{|Vin|}{2 \cdot N \cdot A_e} \cdot \frac{Vout - |Vin|}{Vout}. \quad (A)$$

4. The power conversion device according to claim 2, wherein the controller is configured to perform feedback control so that an input current of the power converter follows sinusoidal current synchronized with the input voltage of the power converter to calculate the duty cycle for the switching element.

5. The power conversion device according to claim 4, wherein the controller is configured to set a control constant for the feedback control on the basis of one of the control frequency and input current of the power converter.

6. The power conversion device according to claim 2, wherein the controller is configured to perform feedback control so that the output voltage of the power converter follows a target output voltage to calculate the duty cycle for the switching element.

7. The power conversion device according to claim 1, wherein
the power converter is an AC/DC converter for converting AC voltage as the input voltage to DC voltage as the output voltage,
the AC/DC converter includes a reactor as the magnetic component, and
the controller is configured to set the switching frequency on the basis of a frequency derived so that current ripple of input current of the power converter as the electric parameter of the power converter becomes a set value, and such that the switching frequency changes stepwise in each of the M intervals on the basis of a half cycle of an input AC voltage phase as the predetermined time width, M being an integer not less than 2.

8. The power conversion device according to claim 7, wherein the controller is configured to set the switching frequency so as to satisfy Expression (B), using a command value ΔIrip_ref for the current ripple of the input current, an inductance L of the reactor, an input voltage detection value Vin of the power converter, and an output voltage detection value Vout of the power converter, $$f_{sw} = \frac{|Vin|}{L \cdot \Delta Irip\_ref} \cdot \frac{Vout - |Vin|}{Vout}. \quad (B)$$

9. The power conversion device according to claim 7, wherein the controller is configured to perform feedback control so that input current of the power converter follows sinusoidal current synchronized with the input voltage of the power converter to calculate the duty cycle for the switching element.

10. The power conversion device according to claim 7, wherein the controller is configured to perform feedback control so that the output voltage of the power converter follows a target output voltage to calculate the duty cycle for the switching element.

11. The power conversion device according to claim 1, wherein
the power converter is a DC/DC converter for converting DC voltage as the input voltage to DC voltage as the output voltage,
the DC/DC converter includes at least one of a reactor or a transformer as the magnetic component, and
the controller is configured to set, the switching frequency on the basis of a frequency derived so that a magnetic flux density of a magnetic core of the reactor or the transformer as the magnetic parameter of the magnetic component becomes a set value, and such that the switching frequency changes stepwise in each of the M intervals on the basis of an operation range of the output voltage of the power converter as the predetermined electric quantity width, M being an integer not less than 2.

12. The power conversion device according to claim 11, wherein the controller is configured to set the switching frequency so as to satisfy Expression (C), using a command value Bref for the magnetic flux density of the magnetic core of the reactor or the transformer, a number N of turns of the reactor or the transformer, an effective sectional area Ae of the magnetic core of the reactor or the transformer, an input voltage detection value Vout of the power converter, and an output voltage detection value Vload of the power converter, $$f_{sw} = \frac{1}{B_{ref}} \cdot \frac{Vout}{4 \cdot N \cdot Ae} \cdot \frac{Vload - Vout}{Vload}. \quad (C)$$

13. The power conversion device according to claim 11, wherein the controller is configured to perform feedback control so that the input voltage of the power converter follows a target input voltage to calculate the duty cycle for the switching element.

14. The power conversion device according to claim 13, wherein the controller is configured to set a control constant for the feedback control on the basis of one of the control frequency and an output current of the power converter.

15. The power conversion device according to claim 11, wherein the controller is configured to perform feedback control so that the output voltage of the power converter follows a target output voltage to calculate the duty cycle for the switching element.

16. The power conversion device according to claim 11, wherein the controller is configured to perform feedback control so that an output current of the power converter follows target output current to calculate the duty cycle for the switching element.

17. The power conversion device according to claim 1, wherein
the power converter is a DC/DC converter for converting DC voltage as the input voltage to DC voltage as the output voltage
the DC/DC converter includes at least one of a reactor or a transformer as the magnetic component, and
the controller is configured to set, the switching frequency on the basis of a frequency derived so that current ripple of output current of the power converter as the electric parameter of the power converter becomes a set value, and such that the switching frequency changes stepwise in each of the M intervals on the basis of an operation range of the output voltage of the power converter as the predetermined electric quantity width, M being an integer not less than 2.

18. The power conversion device according to claim 17, wherein the controller is configured to set the switching frequency so as to satisfy Expression (D), using a command value ΔIrip_ref for the current ripple of the output current of the power converter, an inductance L of the reactor or the transformer, an input voltage detection value Vout of the power converter, and an output voltage detection value Vload of the power converter, $$f_{sw} = \frac{Vout}{2 \cdot L \cdot \Delta Irip\_ref} \cdot \frac{Vload - Vout}{Vload}. \qquad (D)$$

19. The power conversion device according to claim 17, wherein the controller is configured to perform feedback control so that the input voltage of the power converter follows a target input voltage to calculate the duty cycle for the switching element.

20. The power conversion device according to claim 17, wherein the controller is configured to perform feedback control so that the output voltage of the power converter follows a target output voltage to calculate the duty cycle for the switching element.

* * * * *